(12) United States Patent
Isaac

(10) Patent No.: US 6,398,692 B1
(45) Date of Patent: Jun. 4, 2002

(54) ENGINE TORQUE CONTROL STRATEGY

(75) Inventor: Emad S. Isaac, Woodridge, IL (US)

(73) Assignee: International Engine Intellectual Property Company, L.L.C., Warrenville, IL (US)

(*) Notice: Subject to any disclaimer, the term of this patent is extended or adjusted under 35 U.S.C. 154(b) by 0 days.

(21) Appl. No.: 09/697,785

(22) Filed: Oct. 26, 2000

Related U.S. Application Data

(60) Provisional application No. 60/161,547, filed on Oct. 26, 1999.

(51) Int. Cl.$^7$ .................. B60K 41/04; F02M 51/00
(52) U.S. Cl. .................................. 477/107; 123/486
(58) Field of Search ................... 477/119, 110, 477/111, 112; 123/445, 446, 457, 458, 478, 480, 486, 488

(56) References Cited

U.S. PATENT DOCUMENTS

| | | | | |
|---|---|---|---|---|
| 4,727,836 A | * | 3/1988 | Oshizawa et al. | 123/501 X |
| 5,468,196 A | * | 11/1995 | Minowa et al. | 477/107 X |
| 5,483,927 A | | 1/1996 | Letang et al. | |
| 5,613,920 A | * | 3/1997 | Uno et al. | 477/110 X |
| 5,615,654 A | | 4/1997 | Weisman, II et al. | |
| 5,713,332 A | * | 2/1998 | Adler et al. | 123/486 X |
| 5,746,679 A | * | 5/1998 | Minowa et al. | 477/107 X |
| 5,948,037 A | * | 9/1999 | Muraki | 701/114 |
| 5,988,141 A | * | 11/1999 | Uchida | 123/480 X |
| 6,041,757 A | * | 3/2000 | Kadota | 123/478 |
| 6,141,615 A | * | 10/2000 | Saito et al. | 477/108 X |
| 6,151,615 A | | 11/2000 | Brooks et al. | |
| 6,164,400 A | * | 12/2000 | Jankovic et al. | 180/65.2 |
| 6,199,006 B1 | * | 3/2001 | Weiss et al. | 180/179 X |

FOREIGN PATENT DOCUMENTS

| | | |
|---|---|---|
| DE | 196 37 395 C1 | 9/1996 |
| EP | 0 953 755 A2 | 11/1999 |

OTHER PUBLICATIONS

Von Dieter Meisberger, Christian Albert and Klaus Bourdon, Die neue Motorsteuerung ME 7.2 von Bosch fur den BMW V8–Motor, MTZ Motortechnische Zeitschrift 59 (1989).

* cited by examiner

Primary Examiner—Charles A Marmor
Assistant Examiner—Roger Pang
(74) Attorney, Agent, or Firm—Dennis Kelly Sullivan; Gilberto Hernandez; Jeffrey P. Calfa

(57) ABSTRACT

A diesel engine control system and method. A first data source provides data defining a current maximum limit for fueling the engine. A second data source provides data defining a torque request for the engine. A third data source providing data distinguishing between the occurrence and non-occurrence of a vehicle event, such as a traction- or transmission-related event, calling for change in value of maximum allowable engine torque from a preset value to a different value. When the third data source data indicates occurrence of a vehicle event calling for change in value of maximum allowable engine torque from the preset value to a different value, the data from the first data source and the data from the second data source are processes to develop data representing a value of maximum allowable engine torque different from the preset value.

10 Claims, 2 Drawing Sheets

ENGINE TORQUE CONTROL STRATEGY

This application derives from, and claims the priority of, the following commonly owned provisional patent application Serial No. 60/161,547, filed Oct. 26, 1999.

FIELD OF THE INVENTION

This invention relates generally to electronic engine controls. More particularly the invention relates to a strategy that is employed by an electronic engine control to develop a certain torque request for an engine in accordance with a certain torque control strategy for controlling engine torque. The invention is useful in the operation of internal combustion engines, especially diesel engines, that power automotive vehicles, such as trucks.

BACKGROUND AND SUMMARY OF THE INVENTION

Because of known relationships between torque and speed that are characteristic of a particular engine, the control of engine torque by control of fuel input to the engine also has control implications for engine speed. Accordingly, a control system and strategy for a diesel engine may include a torque/speed control strategy. The occurrence of certain events while a diesel-engine-powered vehicle is being driven may impact the engine torque/speed control strategy, and therefore it may be desirable to take the occurrence of such events into account in the torque/speed control system and strategy. Examples of such events are traction-control-related events and transmission-related events. A traction-control-related event involves a change in traction while a transmission-related event involves a transmission gear change.

Accordingly, one generic aspect of the invention relates to a control system for controlling a diesel engine powering a motor vehicle. The control system comprises: a processor programmed to provide a preset value of maximum allowable engine torque data that is processed for control of the engine during non-occurrence of a vehicle event that would otherwise call for changing the preset value to a different value; a first data source providing data defining a current maximum limit for fueling the engine; a second data source providing data defining a torque request for the engine; and a third data source providing data distinguishing between the occurrence and non-occurrence of a vehicle event calling for change in the value of the maximum allowable engine torque data from the preset value to a different value. When the third data source data indicates occurrence of a vehicle event calling for change in the value of the maximum allowable engine torque data from the preset value to a different value, the processor processes the data from the first data source and the data from the second data source to develop data that is then processed by the processor as the value of the maximum allowable engine torque data instead of the preset value.

Another generic aspect of the invention relates to a method for controlling a diesel engine powering a motor vehicle. The method comprises programming a processor to provide a preset value of maximum allowable engine torque data that is processed for control of the engine during non-occurrence of a vehicle event that would otherwise call for changing the preset value to a different value. The method further comprises developing data defining a current maximum limit for fueling the engine; developing data defining a torque request for the engine; and developing data distinguishing between the occurrence and nonoccurrence of a vehicle event calling for change in the value of the maximum allowable engine torque data from the preset value to a different value. When the data distinguishing between the occurrence and non-occurrence of a vehicle event calling for change in the value of the maximum allowable engine torque data from the preset value to a different value indicates occurrence of a vehicle event calling for change in the value of the maximum allowable engine torque data from the preset value to a different value, the data defining a. current maximum limit for fueling the engine and the data defining a torque request for the engine are processed to develop data that is then processed by the processor as the value of the maximum allowable engine torque data instead of the preset value.

Further aspects will be set forth hereinafter in the disclosure and various claims.

The foregoing, along with further features and advantages of the invention, will be seen in the following disclosure of a presently preferred embodiment of the invention depicting the best mode contemplated at this time for carrying out the invention. The disclosure includes drawings, as now briefly described.

DESCRIPTION OF THE INVENTION

Figure 1:
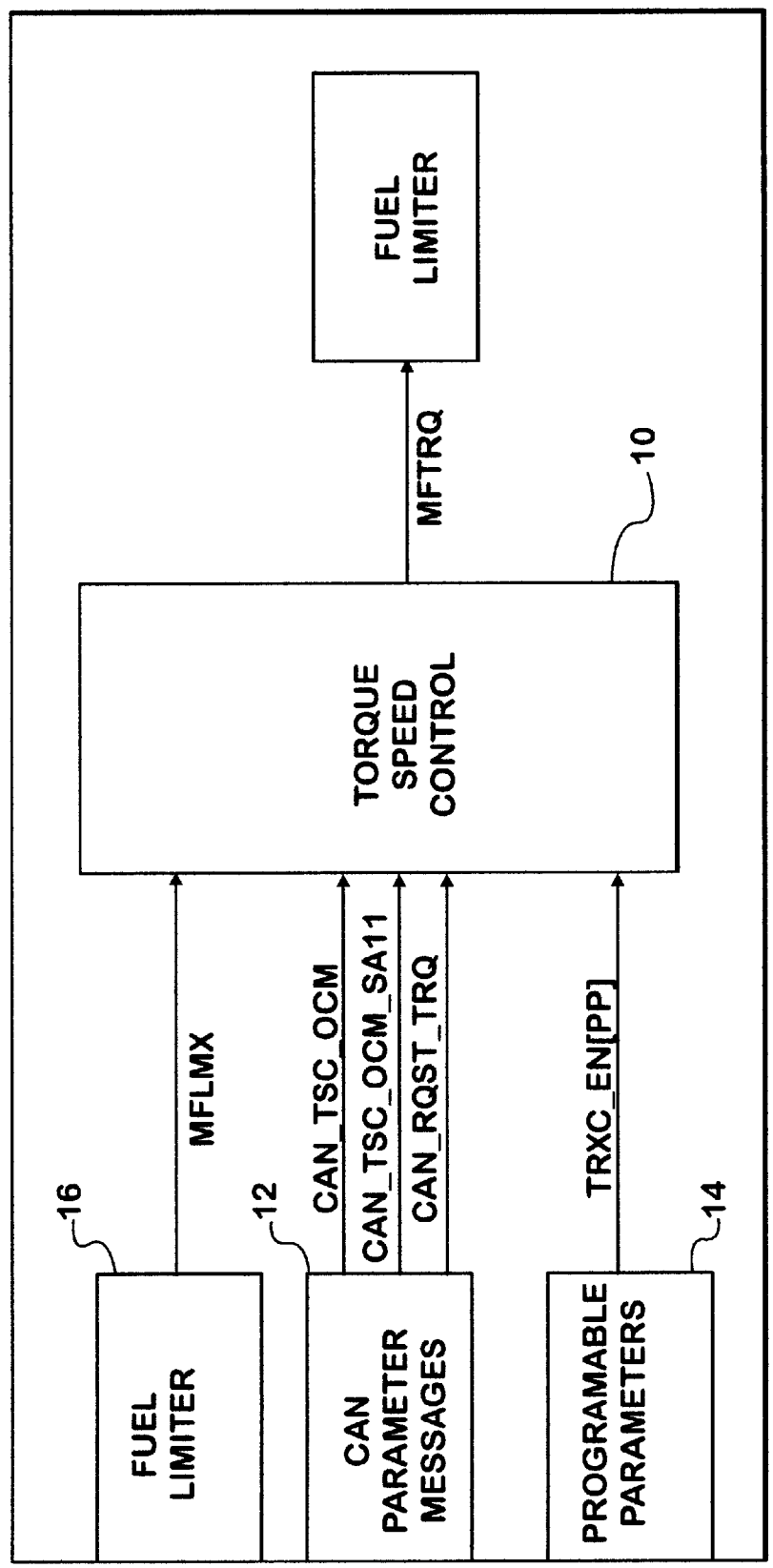
FIG. 1 is a schematic block diagram of a portion of an electronic engine control interface implementing the inventive torque control strategy.

FIG. 1 shows an interface diagram representing, in a general manner, a certain torque/speed control strategy for an automotive vehicle engine, a diesel engine in particular. The goal of the strategy is to develop a signal requesting a certain maximum torque limit that may, in accordance with overall fuel control strategy, will be effective as a command to limit fuel input to, and hence torque produced by, the engine for the purpose of reducing engine torque to a desired level appropriate to certain operation of a vehicle traction control and/or certain operation of other vehicle control, such as vehicle transmission operation. The signal representing the maximum torque limit request is designated MFTRQ and is developed by a control processor that embodies an algorithm for processing certain data signals. The reader will appreciate that the processor and algorithm are embodied in FIG. 1 within the general context of a block 10 named Torque Speed Control. The signal MFTRQ may ultimately be converted to a form suitable for acting on a component, or components, of the engine fuel system to implement a fuel limiter function, causing the fuel input to the engine to be controlled by the signal MFTRQ.

The signals which the Torque Speed Control 10 processes to execute the strategy are designated MFLMX, TRXC_EN[PP], CAN_TSC_OCM, CAN_TSC_OCM_SA11, and CAN_RQST_TRQ. The latter three signals are CAN parameter message data published on the CAN bus of the control system and are designated generally by the reference numeral 12. The signal TRXC_EN[PP] is a programmable parameter, reference numeral 14, that defines whether the vehicle is equipped with traction control. The signal MFLMX defines a maximum fuel limit presently allowed by a fuel limiter function of the control, reference numeral 16.

When a vehicle is being driven and certain traction control events and transmission requests are not occurring, the control develops a torque request which is broadcast on the CAN bus as a data signal CAN_RQST_TRQ. The torque request is derived from various data sources, including the extent to which the driver is depressing the vehicle accelerator. The control causes the fuel system to input fuel into the engine in amounts corresponding to the CAN_RQST_TRQ data signal, thereby causing the engine to operate at the requested torque.

Should certain traction control events and/or vehicle control functions, such as transmission requests, occur, it is deemed appropriate to activate the disclosed torque/speed control strategy. It is the CAN_RQST_TRQ data signal that is processed for the purpose of developing a maximum torque limit that is active concurrent with certain traction control events or transmission requests.

According to the inventive principles, the strategy calls for several initial determinations: 1) whether the request for activating the strategy is initiated by a traction control event or by a control request for a vehicle control device, such as a transmission request; and 2) whether the override control mode derives from torque control or from torque limiting, and if so, which function. Torque control refers to a specific value which the engine must achieve as a desired set point. Torque limiting refers to a set limit which the engine torque may, depending on setting, not exceed or go below; in other words, torque may vary, but only within the bound(s) set by the torque limit.

Figure 2:
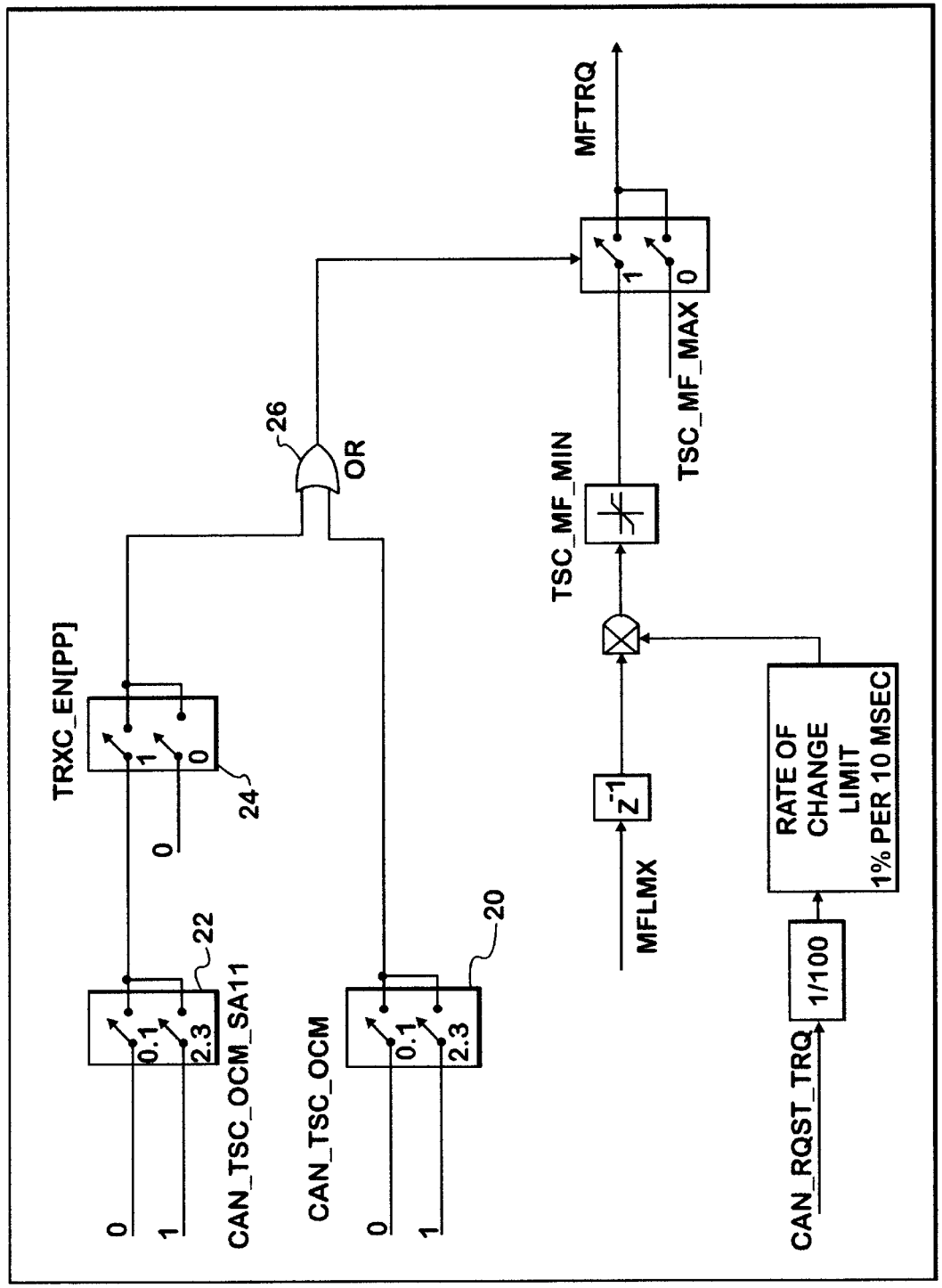
FIG. 2 is a more detailed diagram of a portion of FIG. 1.

Once it has been determined that either a certain traction control event (CAN_TSC_OCM_SA11) or a certain request (CAN_TSC_OCM), such as a transmission request has occurred, and that such an event and/or request continues to be active, the CAN_RQST_TRQ data signal is processed in the manner shown in FIG. 2.

Upon occurrence of a certain request, such as a transmission request for example, that calls for activation of the torque/speed control strategy, a data signal is broadcast on the CAN bus in accordance with a standard protocol, That broadcast is represented by the block 20 in FIG. 2. Upon occurrence of a certain condition indicative of a certain traction control event that calls for activation of the torque/speed control strategy, a data signal is broadcast on the CAN bus in accordance with a standard protocol. That broadcast is represented by the block 22 in FIG. 2. To avoid activation of the torque/speed control strategy should the vehicle not actually have traction-control, the control is also programmed to confirm that the vehicle does have a traction control system, and that programming is represented by the reference numeral 24. Hence, only if the control has been so programmed will a broadcast on the CAN data link indicating occurrence of a traction control event calling for activation of the torque/speed control strategy actually activate the strategy. The OR function represented by the reference numeral 26 denotes that either a certain request, such as a transmission request in this example, or a certain traction control event on a vehicle actually having a traction control, will activate the strategy, and that the strategy will remain activated only so long as an event does too.

The signal MFLMX represents the current maximum limit at which fuel is allowed to be introduced into the engine, and it is this limit that is processed in accordance with the inventive strategy. The strategy is executed at a certain rate, 20 Hz for example, so that the signal MFTRQ is updated at 50 millisecond intervals. The MFTRQ signal is derived from both the MFLMX and CAN_RQST_TRQ signals. The requested torque signal CAN_RQST_TRQ is, after being scaled properly, multiplied by the current maximum fuel limit signal MFLMX at a certain rate, 1% per 10 milliseconds being an example of a rate. This translates to 5% per iteration based on the 20 Hz execution rate of the strategy (as required by particular requirements of the transmission). The scalar TSC_MF_MIN is used to assure that the maximum fuel limit would never be low enough to cause the engine to stall. So long as the control strategy continues to be active, the signal MFTRQ is updated every 50 milliseconds. Otherwise when the request is no longer active, then the signal MFTRQ is made equal to TSC_MF_MAX, which is a preset default value.

While a presently preferred embodiment of the invention has been illustrated and described, it should be appreciated that principles of the invention are applicable to all embodiments that fall within the scope of the following claims.

What is claimed is:

1. A control system for controlling a diesel engine powering a motor vehicle comprising:

a processor programmed to provide a preset value of maximum allowable engine torque data that is processed for control of the engine during non-occurrence of a vehicle event that would otherwise call for changing the preset value to a different value;

a first data source providing data defining a current maximum limit for fueling the engine;

a second data source providing data defining a torque request for the engine;

a third data source providing data distinguishing between the occurrence and non-occurrence of a vehicle event calling for change in the value of the maximum allowable engine torque data from the preset value to a different value;

wherein when the third data source data indicates occurrence of a vehicle event calling for change in the value of the maximum allowable engine torque data from the preset value to a different value, the processor processes the data from the first data source and the data from the second data source to develop data that is then processed by the processor as the value of the maximum allowable engine torque data instead of the preset value.

2. A diesel engine control system as set forth in claim 1 in which the third data source provides data distinguishing between the occurrence and non-occurrence of a traction-related event.

3. A diesel engine control system as set forth in claim 1 in which the third data source provides data distinguishing between the occurrence and non-occurrence of a transmission-related event.

4. A control system for controlling a diesel engine powering a motor vehicle comprising:

a processor;

a first data source providing data defining a current maximum limit for fueling the engine;

a second data source providing data defining a torque request for the engine;

a third data source providing data distinguishing between the occurrence and non-occurrence of a vehicle event calling for change in value of maximum allowable engine torque from a preset value to a different value;

wherein when the third data source data indicates occurrence of a vehicle event calling for change in value of maximum allowable engine torque from the preset value to a different value, the processor processes the data from the first data source and the data from the second data source to develop data representing a value of maximum allowable engine torque different from the preset value; and in which the processor scales the data from the second data source and then multiplies the scaled data by the first data at a certain rate to develop data representing the value of maximum allowable engine torque different from the preset value.

5. A diesel engine control system as set forth in claim 4 in which the processor compares the data representing the value of maximum allowable engine torque different from the preset value with data defining a minimum allowable torque before the former data is used by the control system to control the engine, and if the value of that former data is less than the value of the data defining minimum allowable torque, the data defining minimum allowable torque is used by the control system instead of that former data.

6. A method for controlling a diesel engine powering a motor vehicle comprising:

programming a processor to provide a preset value of maximum allowable engine torque data that is processed for control of the engine during non-occurrence of a vehicle event that would otherwise call for changing the preset value to a different value;

developing data defining a current maximum limit for fueling the engine;

developing data defining a torque request for the engine;

developing data distinguishing between the occurrence and non-occurrence of a vehicle event calling for change in the value of the maximum allowable engine torque data from the preset value to a different value; and when the data distinguishing between the occurrence and non-occurrence of a vehicle event calling for change in the value of the maximum allowable engine torque data from the preset value to a different value indicates occurrence of a vehicle event calling for change in the value of the maximum allowable engine torque data from the preset value to a different value, processing the data defining a current maximum limit for fueling the engine and the data defining a torque request for the engine to develop data that is then processed by the processor as the value of the maximum allowable engine torque data instead of the preset value.

7. A method as set forth in claim 6 in which step of developing data distinguishing between the occurrence and non-occurrence of a vehicle event calling for change in the value of the maximum allowable engine torque data from the preset value to a different value comprises distinguishing between the occurrence and non-occurrence of a traction-related event.

8. A method as set forth in claim 6 in which step of developing data distinguishing between the occurrence and non-occurrence of a vehicle event calling for change in the value of the maximum allowable engine torque data from the preset value to a different value comprises distinguishing between the occurrence and non-occurrence of a transmission-related event.

9. A method for controlling a diesel engine powering a motor vehicle comprising:

developing data defining a current maximum limit for fueling the engine;

developing data defining a torque request for the engine;

developing data distinguishing between the occurrence and non-occurrence of a vehicle event calling for change in value of maximum allowable engine torque from a preset value to a different value; and when the data distinguishing between the occurrence and non-occurrence of a vehicle event calling for change in value of maximum allowable engine torque from a preset value to a different value indicates occurrence of a vehicle event calling for change in value of maximum allowable engine torque from the preset value to a different value, processing the data defining a current maximum limit for fueling the engine and the data defining a torque request for the engine to develop data representing a value of maximum allowable engine torque different from the preset value; and in which processing the data defining a current maximum limit for fueling the engine and the data defining a torque request for the engine to develop data representing a value of maximum allowable engine torque different from the preset value comprises scaling the data defining a torque request for the engine and then multiplying the scaled data by the data defining a current maximum limit for fueling the engine at a certain rate to develop data representing the value of maximum allowable engine torque different from the preset value.

10. A method as set forth in claim 9 including comparing the data representing the value of maximum allowable engine torque different from the preset value with data defining a minimum allowable torque before the former data is used by the control system to control the engine, and if the value of that former data is less than the value of the data defining minimum allowable torque, using the data defining minimum allowable torque for engine control instead of that former data.

* * * * *